United States Patent
Fukagawa et al.

(10) Patent No.: US 9,022,561 B2
(45) Date of Patent: May 5, 2015

(54) PLASTIC OPTICAL PRODUCT AND PLASTIC LENS FOR SPECTACLES

(71) Applicant: Tokai Optical Co., Ltd., Okazaki-Shi (JP)

(72) Inventors: Tsuyoshi Fukagawa, Okazaki (JP); Hirotoshi Takahashi, Okazaki (JP)

(73) Assignee: Tokai Optical Co., Ltd., Okazaki-Shi (JP)

( * ) Notice: Subject to any disclaimer, the term of this patent is extended or adjusted under 35 U.S.C. 154(b) by 121 days.

(21) Appl. No.: 13/660,077

(22) Filed: Oct. 25, 2012

(65) Prior Publication Data

US 2013/0050636 A1    Feb. 28, 2013

Related U.S. Application Data

(63) Continuation of application No. PCT/JP2011/061308, filed on May 17, 2011.

(30) Foreign Application Priority Data

May 20, 2010    (JP) ................. 2010-116625

(51) Int. Cl.
*G02C 7/16* (2006.01)
*G02B 1/04* (2006.01)

(52) U.S. Cl.
CPC ................ *G02B 1/115* (2013.01); *G02B 1/043* (2013.01)

(58) Field of Classification Search
CPC ............ G02C 7/022; G02C 7/10; G02B 1/11; G02B 1/115
USPC ........................ 351/159.57, 159.62
See application file for complete search history.

(56) References Cited

U.S. PATENT DOCUMENTS

| | | |
|---|---|---|
| 2004/0240093 A1 | 12/2004 | Yoshikawa et al. |
| 2007/0178315 A1 | 8/2007 | Thomas et al. |
| 2008/0213473 A1* | 9/2008 | Roisin et al. ................... 427/162 |
| 2009/0141357 A1 | 6/2009 | Kamura et al. |
| 2009/0191391 A1 | 7/2009 | Naito et al. |

(Continued)

FOREIGN PATENT DOCUMENTS

| | | |
|---|---|---|
| CN | 101498794 A | 8/2009 |
| CN | 102369462 A | 3/2012 |

(Continued)

OTHER PUBLICATIONS

Japanese Office Action dated Jun. 24, 2013.

(Continued)

*Primary Examiner* — Jordan Schwartz
(74) *Attorney, Agent, or Firm* — Burr & Brown, PLLC

(57) ABSTRACT

In a plastic optical product, an optical multilayer film having a seven layer structure is formed on a surface of a plastic substrate directly or with an interlayer interposed therebetween. In the seven layer structure of the optical multilayer film, a layer on the plastic substrate side is a low refractive index layer, and the low refractive index layers and high refractive index layers are alternately disposed. At least the high refractive index layer at the center of the seven layer structure contains substoichiometric titanium oxide. In a plastic lens for spectacles belonging to such a plastic optical product, the plastic substrate is a plastic lens substrate for spectacles, the interlayer is a hard coat film, and the optical multilayer film is an anti-reflective film.

6 Claims, 1 Drawing Sheet

(56) References Cited

U.S. PATENT DOCUMENTS

| | | |
|---|---|---|
| 2012/0062833 A1 | 3/2012 | Fukagawa et al. |
| 2012/0069295 A1 | 3/2012 | Fukagawa et al. |
| 2012/0075705 A1 | 3/2012 | Beinat et al. |

FOREIGN PATENT DOCUMENTS

| | | |
|---|---|---|
| DE | 199 63 866 A1 | 8/2001 |
| EP | 2 083 287 A1 | 7/2009 |
| EP | 2 109 134 A1 | 10/2009 |
| EP | 2 431 772 A1 | 3/2012 |
| FR | 2 864 251 A1 | 6/2005 |
| JP | 2003-121636 A1 | 4/2003 |
| JP | 2005-234188 A1 | 9/2005 |
| JP | 2005-338366 A1 | 12/2005 |
| JP | 2007-520738 A1 | 7/2007 |
| JP | 2009-128820 A1 | 6/2009 |
| JP | 2010-091995 A1 | 4/2010 |
| WO | 96/41215 A1 | 12/1996 |
| WO | 2008/001011 A2 | 1/2008 |
| WO | 2010/113622 A1 | 10/2010 |
| WO | 2010/147048 A1 | 12/2010 |

OTHER PUBLICATIONS

Extended European Search Report (Application No. 11783547.0) dated Oct. 9, 2013.

International Search Report dated Jun. 28, 2011 (with English translation).

Chinese Office Action (Application No. 201180024709) dated Apr. 22, 2014 (with English translation).

* cited by examiner

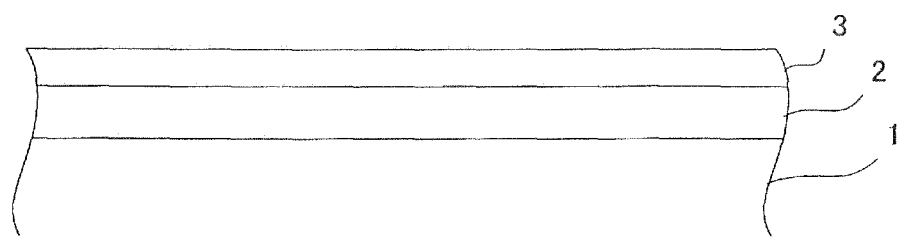

PLASTIC OPTICAL PRODUCT AND PLASTIC LENS FOR SPECTACLES

CROSS-REFERENCE TO RELATED APPLICATION

This application claims the entire benefit of Japanese Patent Application Number 2010-116625 filed on May 20, 2010 and International Patent Application PCT/JP2011/061308 filed on May 17, 2011, the entirety of which is incorporated by reference.

BACKGROUND OF THE INVENTION

1. Field of the Invention

The present invention relates to a plastic optical product and a plastic lens for spectacles that have an optical multilayer film but which are excellent in heat resistance.

2. Description of Related Art

In order to impart anti-reflection properties and the like to plastic lenses, an anti-reflective film including a metal oxide film is formed on a plastic substrate or on a hard coat film of the substrate. Here, the metal oxide film has a smaller coefficient of thermal expansion than those of the plastic substrate and the hard coat film. On this account, when a large amount of heat is applied to a plastic lens, the metal oxide film cannot follow the deformation of the plastic substrate or the hard coat film due to their comparatively large thermal expansion and this may generate cracks on the anti-reflective film.

In order to improve such characteristics against heat and to impart heat resistance, for example, as disclosed in Japanese Laid-open Patent Application, Publication No. 2009-128820 (JP2009-128820A), it is known that a composite layer including at least two metal oxide layers that contain the same metallic element but have different oxygen contents from each other is included in an anti-reflective film.

However, in the invention disclosed in JP2009-128820A, in order to impart heat resistance while maintaining the anti-reflection properties, the composite layer is disposed away from a substrate side (hard coating side) (via a common anti-reflective multilayer film structure). As a result, the common anti-reflective multilayer film structure cannot follow the deformation due to thermal expansion and the heat resistance is not much improved. In addition, especially in the case of lens for spectacles and the like, a round lens is not used as it is and is usually edged to have a certain outer shape such as an ellipsoidal shape, and then the edged lenses are inserted in a frame to be used. However, the lens in JP2009-128820A cannot be considered to have significantly improved heat resistance after inserted in a frame.

Therefore, an object of the present invention is to provide a plastic optical product and a plastic lens for spectacles that have an optical multilayer film but which are excellent in heat resistance.

SUMMARY OF THE INVENTION

In order to achieve the object according to one aspect of the present invention, an optical multilayer film having seven layers is provided, formed on a surface of a plastic substrate directly or with an interlayer interposed therebetween, with a layer on the plastic substrate side being a low refractive index layer, wherein the low refractive index layers and high refractive index layers are alternately disposed, and wherein at least the high refractive index layer at the center contains substoichiometric titanium oxide.

According to a second aspect of the present invention, in order to achieve an object of providing a product that has a simple structure but which is excellent in heat resistance in addition to the object mentioned above, only the high refractive index layer at the center contains substoichiometric titanium oxide.

According to a third aspect of the present invention, in order to achieve an object of improving the ease of production by containing the same material elements in the high refractive index layers in addition to the object mentioned above, each of the high refractive index layers is formed of substoichiometric titanium oxide or titanium dioxide.

According to a fourth aspect of the present invention, a plastic lens for spectacles is provided, including the plastic optical product of the invention. The plastic lens for spectacles is characterized in that the plastic substrate is a plastic lens substrate for spectacles, the interlayer is a hard coat film, and the optical multilayer film is an anti-reflective film.

In the present invention, at least the center layer of the optical multilayer film contains substoichiometric titanium oxide. This improves the following performance of the optical multilayer film to a plastic substrate when heat is applied, while maintaining good anti-reflective properties and other properties of the optical multilayer film. Therefore, an optical member having excellent heat resistance is provided.

BRIEF DESCRIPTION OF THE DRAWINGS

FIG. 1 is a partial sectional view of a surface of a plastic optical product of the present invention.

DETAILED DESCRIPTION OF THE INVENTION

Exemplary embodiments of the present invention will now be described with reference to the drawings as appropriate. The embodiment of the present invention is not limited to these examples.

In a plastic optical product of the present invention, as shown in FIG. 1, on a surface of a plastic substrate 1, an interlayer 2 and an optical multilayer film 3 are stacked in this order. The interlayer 2 may not be provided, and the optical multilayer film 3 may be directly stacked on the plastic substrate 1, and a water repellent film or the like may be further formed on the optical multilayer film 3.

Examples of the optical product include spectacle lenses, camera lenses, projector lenses, binocular lenses, telescope lenses, and various filters. Examples of the material of the plastic substrate 1 include a polyurethane resin, an episulfide resin, a polycarbonate resin, an acrylic resin, a polyethersulfone resin, a poly(4-methylpentene-1) resin, and a diethylene glycol bis(allyl carbonate) resin.

The interlayer 2 corresponds to, for example, a hard coat film provided on a surface of the plastic substrate 1. The hard coat film is made of, for example, an organosiloxane compound, other organic silicon compounds, or an acrylic compound. The interlayer 2 may include a primer layer as an underlayer of the hard coat film. In this case, the primer layer is formed of, for example, a polyurethane resin, an acrylic resin, a methacrylic resin, or an organosilicon resin.

The optical multilayer film 3 is typically formed by, for example, vacuum deposition or sputtering and is formed by alternately stacking a low refractive index layer and a high refractive index layer each including a metal oxide. The low refractive index layer is formed using, for example, silicon dioxide ($SiO_2$) and the high refractive index layer is formed using, for example, titanium oxide. Usable examples of the low refractive index material and the high refractive index material except substoichiometric titanium oxide include known materials such as $Al_2O_3$ (dialuminum trioxide), $Y_2O_3$ (diyttrium trioxide), $ZrO_2$ (zirconium dioxide), $Ta_2O_5$ (tantalum pentoxide), $HfO_2$ (hafnium dioxide), and $Nb_2O_5$ (niobium pentoxide).

In the optical multilayer film 3, the first layer of the multilayer film 3 provided on the plastic substrate 1 or the interlayer 2 is the low refractive index layer, and the second layer is the high refractive index layer. The optical multilayer film 3 includes seven layers stacked from the first layer to the seventh layer in this manner. Examples of the function of the optical multilayer film 3 include an anti-reflective film, a mirror, a half mirror, an ND filter, and a band-pass filter.

In the optical multilayer film 3, at least the center fourth layer contains insufficiently oxidized titanium oxide (substoichiometric titanium oxide, TiOx, x<2). In other words, only the fourth layer contains TiOx, and the second and sixth layers contain titanium dioxide ($TiO_2$) (Example 1), the second and fourth layers contain TiOx and the sixth layer contains $TiO_2$ (Example 2), the fourth and sixth layers contain TiOx and the second layer contains $TiO_2$ (Example 3), or the second, fourth, and sixth layers contain TiOx (Example 4).

TiOx is formed from oxygen in a (slightly) insufficient equivalent with respect to titanium. For example, a titanium oxide such as trititanium pentoxide is evaporated while feeding oxygen gas, thereby depositing a substoichiometric titanium oxide on the plastic substrate 1. During the deposition, the substoichiometric titanium oxide is formed by controlling the feeding condition (for example, feeding amount and pressure during film formation) of the oxygen gas (depending on the amount of titanium oxide used). During the deposition, an inert gas may be fed together with oxygen gas and the feeding condition of the inert gas may be controlled, thereby controlling the insufficient oxidation amount. During the film formation, in order to improve film quality, ion assistance in which an oxygen ion is introduced in combination while satisfying a film formation condition, may be appropriately performed at a predetermined accelerating voltage or a predetermined accelerating current. Alternatively, another ion such as an argon ion may be used in place of the oxygen ion. In place of the ion assistance or in combination with the ion assistance, plasma treatment may be performed.

When the optical multilayer film 3 has a five-layer structure or a nine-layer structure, the low refractive index layer is disposed at the center in the overall layer structure. When the optical multilayer film 3 has a three-layer structure or an eleven-layer structure, the high refractive index layer is disposed at the center of the layered structure. However, the three-layer structure cannot sufficiently impart various functions such as the anti-reflective function. However, because a nine or more-layer structure requires increased time and effort for the formation of the film, such a structure is not practical.

Next, Examples and Comparative Examples of the present invention will be described. However, Examples do not limit the scope of the present invention.

<<Overview>>

Examples 1 to 4 were prepared as examples and Comparative Examples 1 to 8 were prepared as comparative examples. These are all plastic tenses and are different from each other only in the structure of an optical multilayer film. Each optical multilayer film of Comparative Examples 1 to 4 included seven layers in total and each optical multilayer film of Comparative Examples 5 to 8 included live layers in total. In Comparative Example 1, each high refractive index layer contained $TiO_2$, in Comparative Example 2, the second high refractive index layer alone contained TiOx, in Comparative Example 3, the sixth high refractive index layer alone contained TiOx, and in Comparative Example 4, the second and sixth high refractive index layers alone contained TiOx. In Comparative Example 5, all high refractive index layers contained $TiO_2$, in Comparative Example 6, the second high refractive index layer alone contained TiOx, in Comparative Example 7, the fourth high refractive index layer alone contained TiOx, and in Comparative Example 8, both the second and fourth high refractive index layers contained TiOx.

<<Plastic Lens Substrate>>

As each plastic lens substrate of Examples 1 to 4 and Comparative Examples 1 to 8, a round lens produced as the description below or a lens obtained by edging the round lens was used. The round lens was produced as follows. With respect to materials in a total amount of 100 parts by weight including 50 parts by weight of norbornene diisocyanate, 25 parts by weight of pentaerythritol tetrakis(3-mercaptopropionate), and 25 parts by weight of bis(mercaptomethyl)-3,6,9-trithia-1,11-undecanediol, 0.03 part by weight of dibutyltin dichloride was added as a catalyst to prepare a homogeneous solution. The solution was poured in a mold for lens and the temperature was raised from 20° C. to 130° C. over 20 hours, thereby curing the materials to produce a round lens substrate. The plastic lens substrate had a refractive index of 1.594 an Abbe number of 42, and a lens power of −3.00.

<<Hard Coat Film>>

In Examples 1 to 4 and Comparative Examples 1 to 8, a hard coating solution described below (including a base solution and various additives) was applied onto the plastic lens substrate by dipping, was dried in an air stream, and was cured by heating at 120° C. for an hour and a half, thereby thrilling a hard coat film having a film thickness of 3.0 micrometers (μm).

The base solution in the hard coating solution was prepared as follows. In a total amount of 283 parts by weight, 11 parts by weight of tetraethoxysilane, 76 parts by weight of γ-glycidoxypropyltrimethoxysilane, and 22 parts by weight of γ-glycidoxypropylmethyldiethoxysilane were added to 150 parts by weight of methanol. To the mixture on ice with stirring, 24 parts by weight of 0.01 normal concentration (N) hydrochloric acid was added dropwise, thereby hydrolyzing the material. The mixture was further stirred at 5° C. for about 24 hours to prepare the base solution.

The hard coating solution was prepared as follows. With respect to 283 parts by weight of the base solution, 192 parts by weight of methanol dispersed titania sol (HINEX AB20 manufactured by JGC Catalysts and Chemicals Ltd.), 0.60 part by weight of a silicon surfactant (L-7604 manufactured by Dow Corning Toray Co., Ltd.) as a leveling agent, 20.02 parts by weight of itaconic acid, and 8.33 parts by weight of dicyandiamide were added, and the whole was further stirred at 5° C. for about 24 hours, thereby preparing the hard coating solution. The hard coating solution had a solid content of about 30%.

<<Optical Multilayer Film>>

The plastic lens substrate with the hard coat film was set in a vacuum chamber and each layer was sequentially formed by vacuum deposition (odd-numbered layers: $SiO_2$, even-numbered layers: titanium oxide). In particular, each even-numbered layer was formed as follows. Oxygen gas was introduced into a vacuum chamber so that the pressure during film formation reached a pressure determined by whether the oxidation was insufficient or not (or by an insufficient degree), and $TiO_2$ or TiOx was deposited using trititanium pentoxide as a deposition material. The reaction pertaining to the film formation is as shown below.

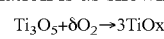

$Ti_3O_5 + \delta O_2 \rightarrow 3TiOx$

The pressures during film formation of the TiOx layers (substoichiometric titanium oxide layers) of Examples 1 to 4 were 5.5E-3 Pascal (Pa), 6.0E-3 Pa, 6.0E-3 Pa, and 6.0E-3 Pa, respectively. Here, each number following "E" is regarded as the exponent of 10 and the exponential FIGURE (digit number) is multiplied by the number followed by "E". In Examples 1 to 3, the pressure during film formation of each $TiO_2$ layer was 1.0E-2 Pa.

In Comparative Examples 2 to 4, the pressure during film formation of each TiOx layer was 5.5E-3 Pa, and in Comparative Examples 6 to 8, the pressure during film formation of each TiOx layer was 6.0E-3 Pa. In Comparative Examples 1 to 7, the pressure during film formation of each $TiO_2$ layer was 1.0E-2 Pa.

Each film structure of Examples 1 to 4 is shown in Table 1, each film structure of Comparative Examples 1 to 4 is shown in Table 2, and each film structure of Comparative Examples 5 to 8 is shown in Table 3. In Table 1 to Table 3, the substoichiometric titanium oxide is shown by "TiOx, insufficient oxidation."

<<Heat Resistance of Round Lens>>

A round lens after anti-reflective film formation was placed in an oven at 60° C. for 5 minutes, and then was taken out. The presence or absence of abnormal changes such as cracks was observed in the appearance. When no appearance defect was observed, the lens was placed in an oven in a similar manner once again and the appearance was observed. This operation was repeated until the total oven treatment time reached 30 minutes. When no appearance defect was observed even after that, the temperature of the oven was raised by 10° C., and heating every 5 minutes and the appearance observation were repeated until the total oven treatment time reached 30 minutes in a similar manner. This procedure was repeated until the appearance defect was observed. Each test result of Examples 1 to 4 is shown in the upper lines in Table 4, each test result of Comparative Examples 1 to 4 is shown in the upper lines in Table 5, and each test result of Comparative Examples 5 to 8 is shown in the upper lines in Table 6. These results reveal that each round lens could be resistant to heat at 120° C.

TABLE 1

| AR film structure | Physical film thickness [nm] | Example 1 | Example 2 | Example 3 | Example 4 |
|---|---|---|---|---|---|
| 1st layer | 25.91 | SiO2 | SiO2 | SiO2 | SiO2 |
| 2nd layer | 13.28 | TiO2 | TiOx insufficient oxidation | TiO2 | TiOx insufficient oxidation |
| 3rd layer | 38.07 | SiO2 | SiO2 | SiO2 | SiO2 |
| 4th layer | 41.50 | TiOx insufficient oxidation | TiOx insufficient oxidation | TiOx insufficient oxidation | TiOx insufficient oxidation |
| 5th layer | 19.83 | SiO2 | SiO2 | SiO2 | SiO2 |
| 6th layer | 36.96 | TiO2 | TiO2 | TiOx insufficient oxidation | TiOx insufficient oxidation |
| 7th layer | 96.31 | SiO2 | SiO2 | SiO2 | SiO2 |
| Air side | | — | — | — | — |

TABLE 2

| AR film structure | Physical film thickness [nm] | Comparative Example 1 | Comparative Example 2 | Comparative Example 3 | Comparative Example 4 |
|---|---|---|---|---|---|
| 1st layer | 25.91 | SiO2 | SiO2 | SiO2 | SiO2 |
| 2nd layer | 13.28 | TiO2 | TiOx insufficient oxidation | TiO2 | TiOx insufficient oxidation |
| 3rd layer | 38.07 | SiO2 | SiO2 | SiO2 | SiO2 |
| 4th layer | 41.50 | TiO2 | TiO2 | TiO2 | TiO2 |
| 5th layer | 19.83 | SiO2 | SiO2 | SiO2 | SiO2 |
| 6th layer | 36.96 | TiO2 | TiO2 | TiOx insufficient oxidation | TiOx insufficient oxidation |
| 7th layer | 96.31 | SiO2 | SiO2 | SiO2 | SiO2 |
| Air side | | — | — | — | — |

TABLE 3

| AR film structure | Physical film thickness [nm] | Comparative Example 5 | Comparative Example 6 | Comparative Example 7 | Comparative Example 8 |
|---|---|---|---|---|---|
| 1st layer | 35.22 | SiO2 | SiO2 | SiO2 | SiO2 |
| 2nd layer | 12.71 | TiO2 | TiOx insufficient oxidation | TiO2 | TiOx insufficient oxidation |
| 3rd layer | 35.41 | SiO2 | SiO2 | SiO2 | SiO2 |
| 4th layer | 112.00 | TiO2 | TiO2 | TiOx insufficient oxidation | TiOx insufficient oxidation |
| 5th layer | 84.57 | SiO2 | SiO2 | SiO2 | SiO2 |
| Air side | | — | — | — | — |

TABLE 4

|  |  | Example 1<br>4th layer,<br>substoichiometric<br>titanium oxide layer | | Example 2<br>2nd and 4th layers,<br>substoichiometric<br>titanium oxide layer | | Example 3<br>4th and 6th layers,<br>substoichiometric<br>titanium oxide layer | | Example 4<br>2nd, 4th, and 6th layers,<br>substoichiometric<br>titanium oxide layer | |
|---|---|---|---|---|---|---|---|---|---|
| Round lens<br>heat<br>resistance | 60° C. | ○ | | ○ | | ○ | | ○ | |
| | 70° C. | ○ | | ○ | | ○ | | ○ | |
| | 80° C. | ○ | | ○ | | ○ | | ○ | |
| | 90° C. | ○ | | ○ | | ○ | | ○ | |
| | 100° C. | ○ | | ○ | | ○ | | ○ | |
| | 110° C. | ○ | | ○ | | ○ | | ○ | |
| | 120° C. | ○ | | ○ | | ○ | | ○ | |
| | 130° C. | X | | X | | X | | X | |
| Acceleration<br>heat<br>resistance<br>of frame<br>(two lenses) | Initial state of<br>acceleration | ○ | ○ | ○ | ○ | ○ | ○ | ○ | ○ |
| | 60° C. | ○ | ○ | ○ | ○ | ○ | ○ | ○ | ○ |
| | 70° C. | ○ | ○ | ○ | ○ | ○ | ○ | ○ | ○ |
| | 80° C. | ○ | ○ | ○ | ○ | ○ | ○ | ○ | ○ |
| | 90° C. | ○ | ○ | ○ | ○ | ○ | ○ | ○ | ○ |
| | 95° C. | ○ | ○ | ○ | ○ | ○ | ○ | ○ | ○ |
| | 100° C. | ○ | ○ | ○ | X | ○ | ○ | X | ○ |
| | 105° C. | ○ | ○ | ○ | — | ○ | X | — | ○ |
| | 110° C. | X | X | X | — | ○ | — | — | X |
| | 115° C. | — | — | — | — | X | — | — | — |
| | Average heat resistance<br>temperature of two lenses | 105° C. | | 100° C. | | 105° C. | | 100° C. | |

TABLE 5

|  |  | Comparative Example 1<br>Without<br>substoichiometric<br>titanium oxide layer | | Comparative Example 2<br>2nd layer,<br>substoichiometric<br>titanium oxide layer | | Comparative Example 3<br>6th layer,<br>substoichiometric<br>titanium oxide layer | | Comparative Example 4<br>2nd and 6th layers,<br>substoichiometric<br>titanium oxide layer | |
|---|---|---|---|---|---|---|---|---|---|
| Round lens<br>heat<br>resistance | 60° C. | ○ | | ○ | | ○ | | ○ | |
| | 70° C. | ○ | | ○ | | ○ | | ○ | |
| | 80° C. | ○ | | ○ | | ○ | | ○ | |
| | 90° C. | ○ | | ○ | | ○ | | ○ | |
| | 100° C. | ○ | | ○ | | ○ | | ○ | |
| | 110° C. | ○ | | ○ | | ○ | | ○ | |
| | 120° C. | ○ | | ○ | | ○ | | ○ | |
| | 130° C. | X | | X | | X | | X | |
| Acceleration<br>heat<br>resistance<br>of frame<br>(two lenses) | Initial state of<br>acceleration | ○ | ○ | ○ | ○ | ○ | ○ | ○ | ○ |
| | 60° C. | ○ | ○ | ○ | ○ | ○ | ○ | ○ | ○ |
| | 70° C. | ○ | ○ | ○ | ○ | ○ | ○ | ○ | ○ |
| | 80° C. | X | X | X | X | ○ | ○ | ○ | ○ |
| | 90° C. | — | — | — | — | X | X | X | X |
| | 95° C. | — | — | — | — | — | — | — | — |
| | 100° C. | — | — | — | — | — | — | — | — |
| | 105° C. | — | — | — | — | — | — | — | — |
| | 110° C. | — | — | — | — | — | — | — | — |
| | 115° C. | — | — | — | — | — | — | — | — |
| | Average heat resistance<br>temperature of two lenses | 70° C. | | 70° C. | | 80° C. | | 80° C. | |

TABLE 6

|  |  | Comparative Example 5<br>Without<br>substoichiometric<br>titanium oxide layer | | Comparative Example 6<br>2nd layer,<br>substoichiometric<br>titanium oxide layer | | Comparative Example 7<br>4th layer,<br>substoichiometric<br>titanium oxide layer | | Comparative Example 8<br>2nd and 4th layers,<br>substoichiometric<br>titanium oxide layer | |
|---|---|---|---|---|---|---|---|---|---|
| Round lens<br>heat<br>resistance | 60° C. | ○ | | ○ | | ○ | | ○ | |
| | 70° C. | ○ | | ○ | | ○ | | ○ | |
| | 80° C. | ○ | | ○ | | ○ | | ○ | |
| | 90° C. | ○ | | ○ | | ○ | | ○ | |
| | 100° C. | ○ | | ○ | | ○ | | ○ | |
| | 110° C. | ○ | | ○ | | ○ | | ○ | |
| | 120° C. | ○ | | ○ | | ○ | | ○ | |
| | 130° C. | X | | X | | X | | X | |
| Acceleration<br>heat<br>resistance<br>of frame | Initial state of<br>acceleration | ○ | ○ | ○ | ○ | ○ | ○ | ○ | ○ |
| | 60° C. | ○ | ○ | ○ | ○ | ○ | ○ | ○ | ○ |
| | 70° C. | ○ | ○ | ○ | ○ | ○ | ○ | ○ | ○ |

TABLE 6-continued

|  |  | Comparative Example 5 Without substoichiometric titanium oxide layer | | Comparative Example 6 2nd layer, substoichiometric titanium oxide layer | | Comparative Example 7 4th layer, substoichiometric titanium oxide layer | | Comparative Example 8 2nd and 4th layers, substoichiometric titanium oxide layer | |
|---|---|---|---|---|---|---|---|---|---|
| (two lenses) | 80° C. | ○ | ○ | X | X | ○ | ○ | X | ○ |
|  | 90° C. | ○ | ○ | — | — | ○ | ○ | — | ○ |
|  | 95° C. | ○ | X | — | — | ○ | ○ | — | ○ |
|  | 100° C. | X | — | — | — | ○ | X | — | X |
|  | 105° C. | — | — | — | — | X | — | — | — |
|  | 110° C. | — | — | — | — | — | — | — | — |
|  | 115° C. | — | — | — | — | — | — | — | — |
| Average heat resistance temperature of two lenses | | 92.5° C. | | 70° C. | | 97.5° C. | | 82.5° C. | |

<<Heat Resistance in Frame>>

Two plastic lenses that were obtained by edging round lenses were inserted into left and right positions of a metal spectacle frame. The frame was placed in a constant temperature and humidity environment at 60° C. and 95% for three days, and the same heat resistance test was performed as the test for round lenses. However, the heating time at each temperature was 20 minutes. When no appearance defect was observed, the frame was immediately heated at a next higher temperature. In the heating at 90° C. or more, the temperature was raised by 5° C. When an appearance defect was observed in one of the left and right lenses but no appearance defect was observed in the other, the test was continued. When lenses in a frame is placed in the constant temperature and humidity environment for three days, the state after the lenses are used for a long period of time can be achieved in a short period of time. This enables the acceleration of test of heat resistance considering the use. Each test result of Examples 1 to 4 is shown in the lower lines in Table 4, each test result of Comparative Examples 1 to 4 is shown in the lower lines in Table 5, and each test result of Comparative Examples 5 to 8 is shown in the upper lines in Table 6. In the lower lines in Table 4 and others, the result of each left lens was shown in a corresponding left column and the result of each right lens was shown in a corresponding right column.

From the results, Comparative Example 1 in which TiOx was not used in a seven-layer structure was resistant to heat at a low temperature of 70° C. and Comparative Examples 2 to 4 in which TiOx was used in a layer except the center layer was resistant to heat at a low temperature of 70 to 80° C. Comparative Examples 1 to 4 having a five-layer structure were resistant to heat at a low temperature of 70 to 97.5° C. (average of left and right) regardless of whether TiOx was used or not. In contrast, Examples 1 to 4 were resistant to heat at 100 to 105° C. and, in particular, in Example 1 in which the center layer alone contained TiOx, both left and right lenses were resistant to heat at 105° C. and were excellent in heat resistance and balance of the lenses.

<<Weather Resistant Adhesiveness>>

On an optical multilayer film surface on a round lens, 100 square compartments having an area of 1 square millimeter ($mm^2$) were formed using a knife. Then, a piece of long adhesive tape was attached so as to cover all the compartments. One end of the tape that was not attached to the lens was held and the tape was peeled at once in a direction perpendicular to the lens surface. After peeling the tape, the number of remaining compartments of the optical multilayer film was counted by appearance (a compartment, from which an optical multilayer film is removed, leaves a trace of peeled coating). This peeling test (adherence evaluation test) was carried out once again after a lens was placed in a sunshine weather meter that mimicked sunshine for 60 hours. The peeling test was repeated every 60 hours of the sunshine application until the total sunshine treatment time reached 240 hours. Each test result of Examples 1 to 4 is shown in the upper lines in Table 7, each test result of Comparative Examples 1 to 4 is shown in the upper lines in Table 8, and each test result of Comparative Examples 5 to 8 is shown in the upper lines in Table 9. Here, "⊚" represents that the number of remaining compartments was 100 to 99. These results reveal that each lens had excellent weather resistant adhesiveness and Examples 1 to 4 had weather resistant adhesiveness equivalent to those of Comparative Examples 1 to 8 (especially Comparative Examples 1 and 5 without TiOx).

TABLE 7

|  |  | Example 1 4th layer, substoichiometric titanitun oxide layer | Example 2 2nd and 4th layers, substoichiometric titanium oxide layer | Example 3 4th and 6th layers, substoichiometric titanium oxide layer | Example 4 2nd, 4th, and 6th layers, substoichiometric titanium oxide layer |
|---|---|---|---|---|---|
| Weather | 0 hr | ⊚ | ⊚ | ⊚ | ⊚ |
| resistant | 60 hr | ⊚ | ⊚ | ⊚ | ⊚ |
| adhesiveness | 120 hr | ⊚ | ⊚ | ⊚ | ⊚ |
| (convex face/ | 180 hr | ⊚ | ⊚ | ⊚ | ⊚ |
| concave face) | 240 hr | ⊚ | ⊚ | ⊚ | ⊚ |
| Artificial | Acid | ○ | ○ | ○ | ○ |
| sweat | Alkali | ○ | ○ | ○ | ○ |
| Boiling | Pure water | ○ | ○ | ○ | ○ |
|  | Tap water | ○ | ○ | ○ | ○ |

TABLE 8

|  |  | Comparative Example 1 Without substoichiometric titanium oxide layer | Comparative Example 2 2nd layer, substoichiometric titanium oxide layer | Comparative Example 3 6th layer, substoichiometric titanium oxide layer | Comparative Example 4 2nd and 6th layers, substoichiometric titanium oxide layer |
|---|---|---|---|---|---|
| Weather resistant adhesiveness (convex face/ concave face) | 0 hr | ◎ | ◎ | ◎ | ◎ |
|  | 60 hr | ◎ | ◎ | ◎ | ◎ |
|  | 120 hr | ◎ | ◎ | ◎ | ◎ |
|  | 180 hr | ◎ | ◎ | ◎ | ◎ |
|  | 240 hr | ◎ | ◎ | ◎ | ◎ |
| Artificial sweat | Acid | ○ | ○ | ○ | ○ |
|  | Alkali | ○ | ○ | ○ | ○ |
| Boiling | Pure water | ○ | ○ | ○ | ○ |
|  | Tap water | ○ | ○ | ○ | ○ |

TABLE 9

|  |  | Comparative Example 5 Without substoichiometric titanium oxide layer | Comparative Example 6 2nd layer, substoichiometric titanium oxide layer | Comparative Example 7 4th layer, substoichiometric titanium oxide layer | Comparative Example 8 2nd and 4th layers, substoichiometric titanium oxide layer |
|---|---|---|---|---|---|
| Weather resistant adhesiveness (convex face/ concave face) | 0 hr | ◎ | ◎ | ◎ | ◎ |
|  | 60 hr | ◎ | ◎ | ◎ | ◎ |
|  | 120 hr | ◎ | ◎ | ◎ | ◎ |
|  | 180 hr | ◎ | ◎ | ◎ | ◎ |
|  | 240 hr | ◎ | ◎ | ◎ | ◎ |
| Artificial sweat | Acid | ○ | ○ | ○ | ○ |
|  | Alkali | ○ | ○ | ○ | ○ |
| Boiling | Pure water | ○ | ○ | ○ | ○ |
|  | Tap water | ○ | ○ | ○ | ○ |

<<Resistance to Sweat>>

A round lens was immersed in each of an acidic artificial sweat liquid and an alkaline artificial sweat liquid for 24 hours and the state of the optical multilayer film was observed. The acidic artificial sweat liquid was prepared by dissolving 10 grams (g) of sodium chloride, 2.5 g of sodium hydrogen phosphate dodecahydrate, and 1.0 g of lactic acid in 1 liter of pure water. The alkaline artificial sweat liquid was prepared by dissolving 10 g of sodium chloride, 2.5 g of sodium hydrogen phosphate dodecahydrate, and 4.0 g of ammonium carbonate in 1 liter of pure water. Each test result of resistance to sweat of Examples 1 to 4 is shown in the middle lines in Table 7, each result of Comparative Examples 1 to 4 is shown in the middle lines in Table 8, and each result of Comparative Examples 5 to 8 is shown in the middle lines in Table 9. Here, "○" represents that an optical multilayer film was not peeled. The results revealed that each lens had excellent resistance to sweat.

<<Boiling Resistance>>

A round lens was immersed in boiling tap water or boiling pure water for 10 minutes, and then was taken out. The lens surface was observed. Each test result of Examples 1 to 4 is shown in the lower lines in Table 7, each test result of Comparative Examples 1 to 4 is shown in the lower lines in Table 8, and each test result of Comparative Examples 5 to 8 is shown in the lower lines in Table 9, in the same manner as in the case of the resistance to sweat. The results reveal that each lens had excellent boiling resistance.

<<Others>>

Even when $Al_2O_3$, $Y_2O_3$, $ZrO_2$, $Ta_2O_5$, $HfO_2$, or $Nb_2O_5$ was used as the low refractive index material or the high refractive index material except the substoichiometric titanium oxide, the obtained lens had heat resistance and the like in the same manner as in the case where $SiO_2$ and $TiO_2$ were used.

CONCLUSION

As described above, by the arrangement of a TiOx layer in at least the center layer of a seven-layer structure, a lens maintains good adhesion properties, resistance to sweat, and boiling resistance equivalent to those of a lens that includes a $TiO_2$ layer alone as the high refractive index material and a lens that includes a TiOx layer in addition to the center layer. At the same time, the lens has uniformly controlled stress balance in the entire film area and good following performance to stress change of a substrate or an interlayer, and can suppress appearance defects such as cracks for a long period of time even after the lens is edged or is inserted into a frame.

What is claimed is:

1. A plastic optical product comprising:
   a plastic substrate; and
   an optical multilayer film having a seven layer structure, formed directly on a surface of the plastic substrate or indirectly on the surface of the plastic substrate with an interlayer interposed therebetween;
   wherein a first layer of the seven layer structure in closest proximity to the plastic substrate is a low refractive index layer consisting of $SiO_2$, and wherein each of the subsequent low refractive index layers of the seven layer structure consists of $SiO_2$ and is alternately stacked and arranged with high refractive index layers in the seven layer structure, each high refractive index layer containing one of titanium dioxide and substoichiometric titanium oxide; and
   wherein only a centermost layer of the seven layer structure is a high refractive index layer containing substoichiometric titanium oxide.

2. A plastic lens for spectacles comprising:
   the plastic optical product according to claim 1, wherein the plastic substrate is a plastic lens substrate for spectacles, the interlayer is a hard coat film, and the optical multilayer film is an anti-reflective film.

3. The plastic optical product according to claim 1, wherein the substoichiometric titanium oxide has a formula of $TiO_x$, wherein $1.66 \leq x < 2$.

4. A plastic lens for spectacles comprising:
the plastic optical product according to claim 3, wherein the plastic substrate is a plastic lens substrate for spectacles,
the interlayer is a hard coat film, and
the optical multilayer film is an anti-reflective film.

5. The plastic optical product according to claim 1, wherein an average heat resistance of the plastic optical product is at least 100° C.

6. A plastic lens for spectacles comprising:
the plastic optical product according to claim 5, wherein the plastic substrate is a plastic lens substrate for spectacles,
the interlayer is a hard coat film, and
the optical multilayer film is an anti-reflective film.

* * * * *